United States Patent
Buterbaugh et al.

(10) Patent No.: US 8,898,484 B2
(45) Date of Patent: Nov. 25, 2014

(54) OPTIMIZING DELIVERY OF REGULATED POWER FROM A VOLTAGE REGULATOR TO AN ELECTRICAL COMPONENT

(75) Inventors: Jerrod K. Buterbaugh, Wake Forest, NC (US); Nickolaus J. Gruendler, Manor, TX (US); Bruce J. Wilkie, Georgetown, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1795 days.

(21) Appl. No.: 12/258,860

(22) Filed: Oct. 27, 2008

(65) Prior Publication Data

US 2010/0102790 A1  Apr. 29, 2010

(51) Int. Cl.
| | |
|---|---|
| G05F 1/00 | (2006.01) |
| H02M 3/28 | (2006.01) |
| H02M 3/158 | (2006.01) |
| G06F 11/30 | (2006.01) |
| H02M 1/00 | (2006.01) |

(52) U.S. Cl.
CPC ...... H02M 3/285 (2013.01); H02M 2001/0012 (2013.01); H02M 3/1584 (2013.01)
USPC .............. 713/300; 702/57; 702/182; 323/283

(58) Field of Classification Search
USPC .................. 323/271, 272, 282–284; 713/300; 702/57, 182
See application file for complete search history.

(56) References Cited

U.S. PATENT DOCUMENTS

| | | | |
|---|---|---|---|
| 4,319,199 A | 3/1982 | Sunderland | |
| 5,982,645 A * | 11/1999 | Levran et al. ................... 363/37 |
| 6,462,525 B1 | 10/2002 | Chen | |
| 6,563,294 B2 * | 5/2003 | Duffy et al. ................... 323/283 |
| 6,674,274 B2 | 1/2004 | Hobrecht et al. | |
| 6,694,270 B2 * | 2/2004 | Hart ................................ 702/57 |
| 6,803,752 B1 | 10/2004 | Chen | |
| 7,007,176 B2 * | 2/2006 | Goodfellow et al. ......... 713/300 |
| 7,174,258 B2 * | 2/2007 | Hart ............................... 702/57 |
| 7,209,804 B2 * | 4/2007 | Curt et al. ..................... 700/286 |
| 7,257,722 B2 * | 8/2007 | Sone ............................. 713/300 |
| 7,278,037 B2 * | 10/2007 | Sone ............................. 713/300 |
| 7,319,312 B2 * | 1/2008 | Leung et al. .................. 323/285 |
| 7,492,221 B2 | 2/2009 | Lawson et al. | |
| 7,664,974 B2 * | 2/2010 | Sone ............................. 713/300 |
| 7,669,061 B2 * | 2/2010 | Curt et al. ..................... 713/300 |
| 7,779,276 B2 * | 8/2010 | Bolan et al. .................. 713/300 |
| 7,881,907 B2 * | 2/2011 | Curt et al. ..................... 702/188 |
| 8,041,521 B2 * | 10/2011 | Bletsch et al. ................. 702/60 |
| 2009/0058379 A1 * | 3/2009 | Sreenivas ...................... 323/241 |

* cited by examiner

OTHER PUBLICATIONS

Kamisetty, et al.; Hybrid Nonlinear Controller for Multiphase VRM; 2003; pp. 574-579; University of Illinois at Chicago; Chicago, IL. USA.

Primary Examiner — Adolf Berhane
Assistant Examiner — Henry Lee, III
(74) Attorney, Agent, or Firm — Edward J. Lenart; Katherine S. Brown; Biggers Kennedy Lenart Spraggins LLP

(57) ABSTRACT

Methods, apparatus, and products for optimizing delivery of regulated power from a voltage regulator to an electrical component, operation of the voltage regulator controlled by a service processor, the voltage regulator including a number of phases, each phase rated to deliver a different maximum power to the electrical component, where optimizing delivery of regulated power includes determining, by the service processor, the present power requirements of the electrical component, and enabling, by the service processor, one or more phases of the voltage regulator in dependence upon the present power requirements of the electrical component.

18 Claims, 4 Drawing Sheets

OPTIMIZING DELIVERY OF REGULATED POWER FROM A VOLTAGE REGULATOR TO AN ELECTRICAL COMPONENT

BACKGROUND OF THE INVENTION

1. Field of the Invention

The field of the invention is data processing, or, more specifically, methods, apparatus, and products for optimizing delivery of regulated power from a voltage regulator to an electrical component.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of technology where computer systems have improved is in increased efficiency in power utilization of the computer systems. Current multi-phase voltage regulators deliver power to a computer or electrical components of the computer in an inefficient manner, however. The phases in current multi-phase voltage regulators are rated to provide an identical maximum power. A voltage regulator having 3 phases rated for 20 amperes ('A') per phase can provide up to 60 A, but is extremely inefficient in providing power at lower current draws. When only 1 amp of current draw is present, for example, the voltage regulator may 'shed' or turn off two of its three phases. Providing a possible 20 A when only 1 A is necessary, however, is inefficient. As such, readers of skill in the art will recognize that there is room for improvement in multi-phase voltage regulator technology.

SUMMARY OF THE INVENTION

Methods, apparatus, and products for optimizing delivery of regulated power from a voltage regulator to an electrical component, operation of the voltage regulator controlled by a service processor, the voltage regulator including a number of phases, each phase rated to deliver a different maximum power to the electrical component, where optimizing delivery of regulated power includes determining, by the service processor, the present power requirements of the electrical component, and enabling, by the service processor, one or more phases of the voltage regulator in dependence upon the present power requirements of the electrical component.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
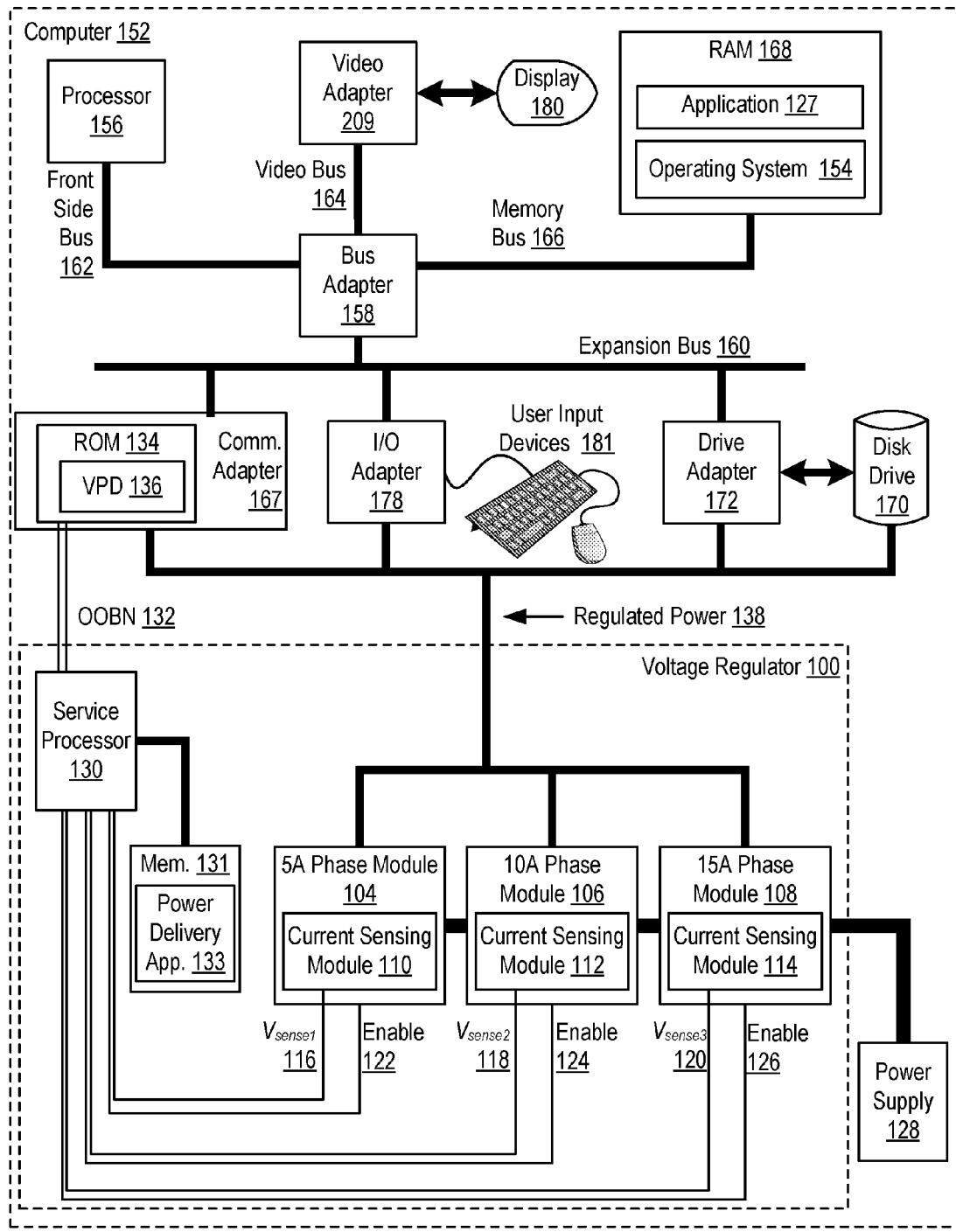
FIG. 1 sets forth a block diagram of automated computing machinery comprising an exemplary computer including electrical components receiving regulated power from a voltage regulator configured for optimized delivery of the regulated power according to embodiments of the present invention.

Exemplary methods, apparatus, and products for optimizing delivery of regulated power from a voltage regulator to an electrical component in accordance with the present invention are described with reference to the accompanying drawings, beginning with FIG. 1. FIG. 1 sets forth a block diagram of automated computing machinery comprising an exemplary computer (152) including electrical components receiving regulated power from a voltage regulator (100) configured for optimized delivery of the regulated power according to embodiments of the present invention. A voltage regulator is an electrical regulator designed to maintain a constant voltage level, that is a regulated voltage, when connected to a load.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an application program (127), a module of computer program instructions that carries out user-level data processing tasks. Such application programs may include word processors, spreadsheet applications, media playback applications, and so on. Also stored in RAM (168) is an operating system (154). Operating systems useful optimizing delivery of regulated power from a voltage regulator to an electrical component according to embodiments of the present invention include UNIX™, Linux™, Microsoft XP™, AIX™, IBM's i5/OS™, and others as will occur to those of skill in the art. The operating system (154) and application program (127) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for optimizing delivery of regulated power from a voltage regulator to an electrical component according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers and for data communications with a data communications network. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for optimizing delivery of regulated power from a voltage regulator to an electrical component according to embodiments of the present invention include modems for wired dial-up communications, Ethernet (IEEE 802.3) adapters for wired data communications network communications, and 802.11 adapters for wireless data communications network communications.

In the example computer (152), the voltage regulator (100) delivers regulated power (138) from a power supply (128) to the communications adapter (167), I/O adapter (178), disk drive adapter (172), and disk drive (170), characterized here as 'electrical components,' that is, components requiring electricity to operate as designed. Although the power supply (128) and voltage regulator (100) are depicted in the example of FIG. 1 as separate components, readers of skill in the art will immediately recognize that a power supply and a voltage regulator configured for optimized delivery of regulated power according to embodiments of the present invention may be configured as a single component, that is, the voltage regulator may be implemented as a component of the power supply (128).

The voltage regulator (100) in the example computer (152) of FIG. 1, delivers power through use of multiple phases. In the example of FIG. 1, power is delivered in each phase through a phase module (104, 106, 108) that includes a current sensing module (110, 112, 113). A phase module (104, 106, 108) is an aggregation of electrical components and logic used to control operation of each phase. Each phase module (104, 106, 108) in the example of FIG. 1, and its corresponding phase, is rated to deliver a different maximum power to the electrical component: one phase module (104) is rated to deliver a maximum of 5 amperes ('A'), a second phase module (106) is rated to deliver a maximum 10 A, and a third phase module (108) is rated deliver a maximum of 15 A.

The voltage regulator (100) in the example computer (152) of FIG. 1 includes a service processor (130) connected by a memory bus to computer memory (131). A service processor is a separate, dedicated internal processor often located on the motherboard of a system component such as a server, on a PCI card, on the chassis of a blade server or telecommunications platform, or in the chassis of a power supply module. The service processor operates independently from a system's CPU and operating system, even if the CPU or OS is locked up or otherwise inaccessible. Service processors are often used to monitor a component's on-board instrumentation (temperature sensors, CPU status, fan speed, voltages, current, power requirements), provide remote reset or power-cycle capabilities, enable remote access to basic input/output system (BIOS) configuration or administrative console information, and, in some cases, provide keyboard and mouse control. The service processor (130) in the example of FIG. 1 controls at least some operation of the voltage regulator (100).

The computer memory (131) may implemented as RAM, EEPROM, Flash Memory, or other type of computer as may occur to readers of skill in the art. Computer memory (131) may also be implemented as memory local to the service processor, that is, internal memory of the service processor, not a separate component. Disposed in the computer memory (131) is a power delivery application (133), a module of computer program instructions that optimizes delivery of regulated power from the voltage regulator (100) to electrical components (167, 178, 172, 170) of the computer (152) according to embodiments of the present invention by causing the service processor (130) to determine the present power requirements of the electrical components (167, 178, 172, 170) and enable one or more phases (104, 106, 108) of the voltage regulator (100) in dependence upon the present power requirements of the electrical components (167, 178, 172, 170).

Power requirements of the components of the computer (152) may vary dynamically during operation of the computer (152). The power requirements may vary for many reasons including, a change in a power state carried out by a power control component of the operating system (154) that throttles the clock speed of the processor (156), varies the supply voltage of the processor (156), varies clock speed of memory bus (166), or disables I/O devices. Power requirements may also change when components are hot swapped, that is removed of installed in the computer during operation. Power requirements may also vary with utilization of the components, such as the hard disk, processor, or communications adapter—greater utilization typically increases power requirements of the components and vice versa.

The service processor in the example of FIG. 1 may determine the present power requirements of the electrical components (167, 178, 172, 170) in various ways. The service processor may, for example, receive from the current sensing modules (110, 112, 114) a measured value of a current draw of the electrical components. A current sensing module as the term is used in this specification is an aggregation of electrical components and software capable of 'sensing' an output current of a phase in terms of a current sensing voltage that varies with respect to the output current of the phase. In the example of FIG. 1, each of the current sensing modules (110, 112, 114) provide such a measured value of a current draw through a current sensing voltage (116, 118, 120) the value of which varies with the current draw on the phase.

Another way in which the service processor (130) in the example computer (152) of FIG. 1 may determine the present power requirements of the electrical components (167, 178, 172, 170) includes retrieving, from the electrical components, vital product data ('VPD') for the electrical component. VPD includes information describing an electrical component that enables the electrical component to be administered at a system level. In embodiments of the present invention, such VPD includes a power requirement for the electrical component. In the example of FIG. 1 the service processor (130) may retrieve, from the ROM (134) of the communications adapter (167), VPD (136) for the communications adapter (167) through an out-of-band data communications network (132). Such an out-of-band data communications network (132) may be implemented with a 1-wire bus, an inter-integrated circuit ($I^2C$) bus, a System Management Bus ('SMB'), a Universal Serial Bus ('USB'), a PCI bus, a SCSI bus, or other data communications bus as will occur to readers of skill in the art. When more than one component is delivered regulated power by the voltage regulator (100) the service processor (130) may sum the individual power requirements of each of the electrical components.

Readers of skill in the art will recognize that enabling one or more phases may include disabling other phases. When all phases (104, 106, 108) of the example voltage regulator (100) are enabled, for example, and the service processor determines that a different combination of phases should be enabled, the service processor may enable the different combination of phases by disabling the one or more phases not included in the different combination. Enabling one or more phases (104, 106, 108) of the voltage regulator (100) in dependence upon the present power requirements of the electrical component may be carried out in various ways. Enabling or more phases may be carried out, for example, by identifying a range of power requirements containing the present power requirements of the electrical component and selecting one or more phases (104, 106, 108) of the voltage regulator to enable in dependence upon the range of power requirements. The selected phases may be any combination of phases, selected to provide the highest possible efficiency in power delivery. Consider as an example, that the present power requirements of the components are 19 A. In such an example, the service processor (130) may identify a range of 16-20 A and select the 5 A and 15 A phases to enable. Such a selection provides a maximum of 20 A, while any other combination of phases provides too little, below 19 A, or a maximum greater than 20 A, a less efficient combination of phases.

Enabling one or more phases (104, 106, 108) of the voltage regulator (100) in dependence upon the present power requirements of the components may also be carried out by enabling the phases (104, 106, 108) incrementally in ascending order of each phase's maximum power rating, first the 5 A phase, then the 10 A phase, then the 15 A phase and so on, when the present power requirements of the electrical components are greater than a predetermined threshold for each phase. The service processor may also carry out the reverse, incrementally disabling phases in descending order of maximum power rating as the present power requirements of the electrical components decrease less than a predetermined threshold for each phase. Consider, as an example, that power requirements of the components increase, over some amount of time, from 3 A to 17 A. Consider also that the 10 A phase module has a predetermined threshold of 5 A, and 15 A phase has a predetermined threshold of 15 A. As the power requirements of the components increase to 5 A, the service processor enables the 10 A phase, providing a maximum of 15 A. As the power requirements of the components increase to 15 A, the service processor enables the 15 A phase, providing a maximum of 30 A. Consider also that the power requirements of the components then decreases, over some amount time, to 13 A. When the power requirements decrease below 15 A, the service processor disables the 15 A phase, leaving only the 10 A phase and 5 A phase enabled. Enabling and disabling phases in ascending or descending order may be implemented in hardware logic using comparator circuits that compare a predetermined voltage level to current sensing voltages of the phases.

The example service processor (130) in the computer (152) of FIG. 1 may enable one or more phases by asserting a signal on the 'Enable' signal line (122, 124, 126) connecting the service processor (130) to each of the phases. The 'Enable' signal lines (122, 124, 126) may be implemented with a 1-wire bus, an $I^2C$ bus, an SMBus, a USB, or other data communications bus as will occur to readers of skill in the art.

The example service processor (130) in the computer (152) of FIG. 1 may also be programmed to detect, during operation of the electrical components (167, 178, 172, 170), a change in the present power requirements of the electrical components and enable one or more phases of the voltage regulator in dependence upon the changed power requirements of the electrical component. As mentioned above, power requirements of electrical components may vary dynamically throughout operation of the components. The service processor may detect a change in the present power requirements by detecting a hot swapping of components in the computer (152). Hot swapping or hot plugging is the ability to remove and replace components of an electrically powered system or machine, typically a computer, while the system is operating. Once the appropriate software is installed on the computer, a user can plug and unplug the component without rebooting. Examples of hot swapping functionality useful in systems that optimize delivery of regulated power from a voltage regulator to an electrical component according to embodiments of the present invention include USB and the ACCESS-.bus ('A.b').

Other protocols that now support hot swapping include:
PCMCIA, a peripheral interface designed for laptop computers. Originally designed for memory expansion, but now used on peripheral components of many kinds, including network cards, modems and hard disks.

The IEEE 1394 interface, Apple's FireWire™, also defines a backplane interface, and is a serial bus interface standard, offering high-speed communications and isochronous real-time data services.

Fibre Channel, a gigabit-speed network technology primarily used for storage networking Fibre Channel is standardized in the T11 Technical Committee of the International Committee for Information Technology Standards ('INCITS'), an American National Standards Institute accredited standards committee.

Serial Advanced Technology Attachment ('SATA'), a computer bus technology primarily designed for transfer of data to and from a hard disk.

Serial Attached SCSI ('SAS'), is a serial communication protocol for direct attached storage ('DAS') devices.

Hot swapping does not necessarily require a service processor on a hot swappable component, but one may be included in the component. In the example of FIG. 1, bus (160) may be configured to support hot swapping of components. Moreover, any of the electrical components (167, 178, 172, 170) may be a hot swappable component.

The arrangement of electrical components, voltage regulator (100), power supply, service processor (130) and other devices making up the exemplary computer system (152) illustrated in FIG. 1 are for explanation, not for limitation. Data processing systems useful according to various embodiments of the present invention may include additional electrical components, servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
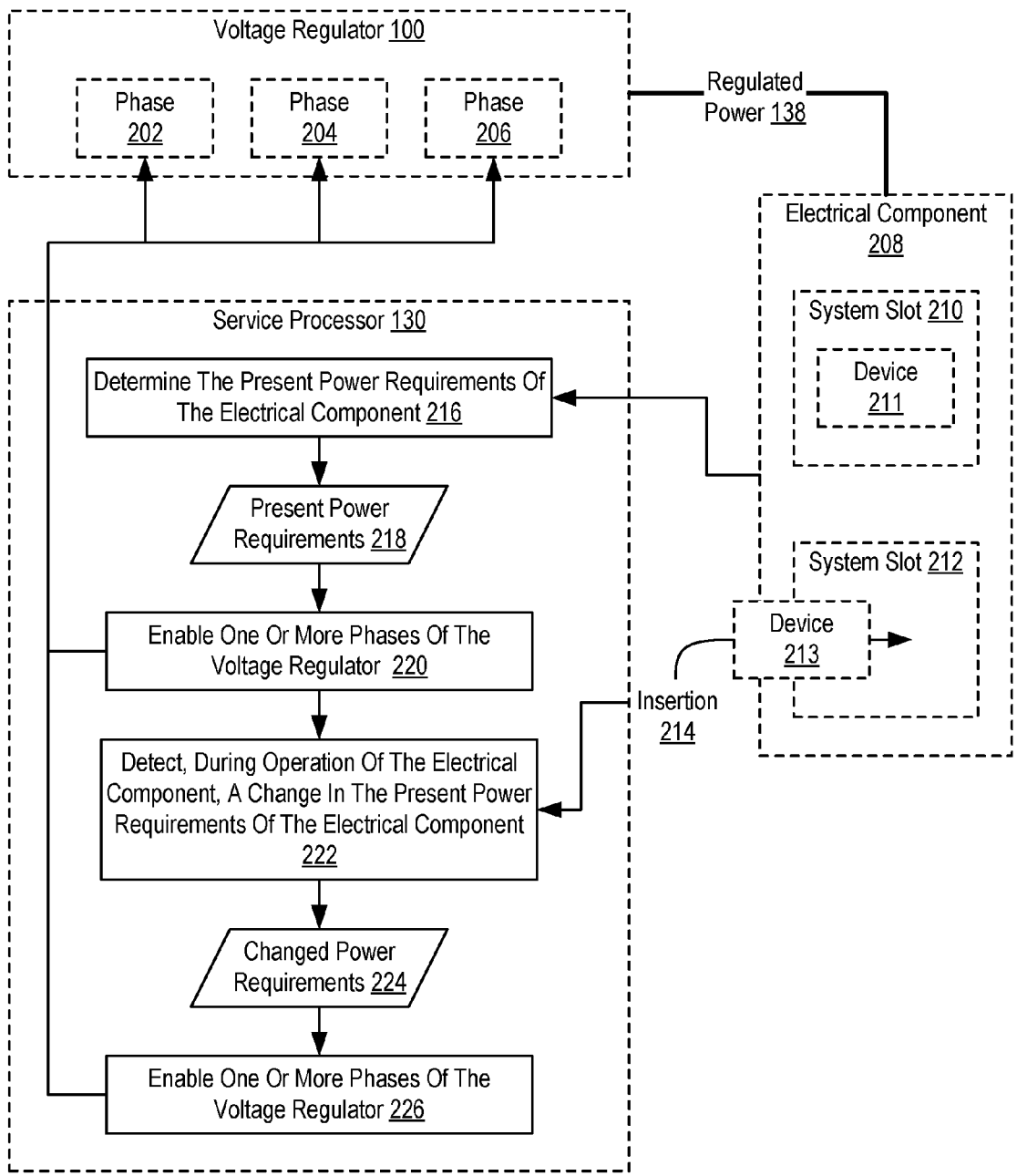
FIG. 2 sets forth a flow chart illustrating an exemplary method for optimizing delivery of regulated power from a voltage regulator to an electrical component according to embodiments of the present invention.

For further explanation, FIG. 2 sets forth a flow chart illustrating an exemplary method for optimizing delivery of regulated power (138) from a voltage regulator to an electrical component according to embodiments of the present invention. The voltage regulator (100) in the example of FIG. 2 includes several phases (202, 204, 206), each phase rated to deliver a different maximum power to the electrical component (208). In the method of FIG. 2, operation of the voltage regulator (100) is controlled by a service processor (130).

The method of FIG. 2 includes determining (216), by the service processor (130), the present power requirements (218) of the electrical component (208) and enabling (220), by the service processor (130), one or more phases (202, 204, 206) of the voltage regulator (100) in dependence upon the present power requirements (218) of the electrical component (208). Enabling (220) one or more phases (202, 204, 206) of the voltage regulator (100) may be carried out by asserting a signal on an out-of-band data communications bus connecting the service processor (130) to the voltage regulator (100) that operates one or more Field-Effect Transistors ('FETs') as a switch, effectively turning a phase on or off. Readers of skill in the art will recognize that FETs are just one type of electrical component that may be used to enable or disable phase of a voltage regulator, other electrical components such as Bipolar Junction Transistors ('BJTs'), Comparators, Flip-Flops and so on may also be used by the service processor (130) to enable or disable phases of the voltage regulator (100).

The method of FIG. 2 also includes detecting (222), by the service processor (130) during operation of the electrical component (208), a change in the present power requirements (218) of the electrical component (208). Detecting (222), a change in the present power requirements (218) of the electrical component (208) may include detecting a hot swapping of a device (211, 213) from a system slot (210, 212) of the electrical component (208). In the example of FIG. 2 an, electrical device (213) is inserted (214) into a system slot (212) thereby increasing the present power requirements of the electrical component (208).

The method of FIG. 2 also includes enabling (226), by the service processor (130), one or more phases (202, 204, 206) of the voltage regulator (100) in dependence upon the changed power requirements (224) of the electrical component. Such phases, again, may be enabled through an out-of-band bus or other dedicated data communications connection by asserting a signal on the connection, operating a FET or other electrical switching component.

Figure 3:
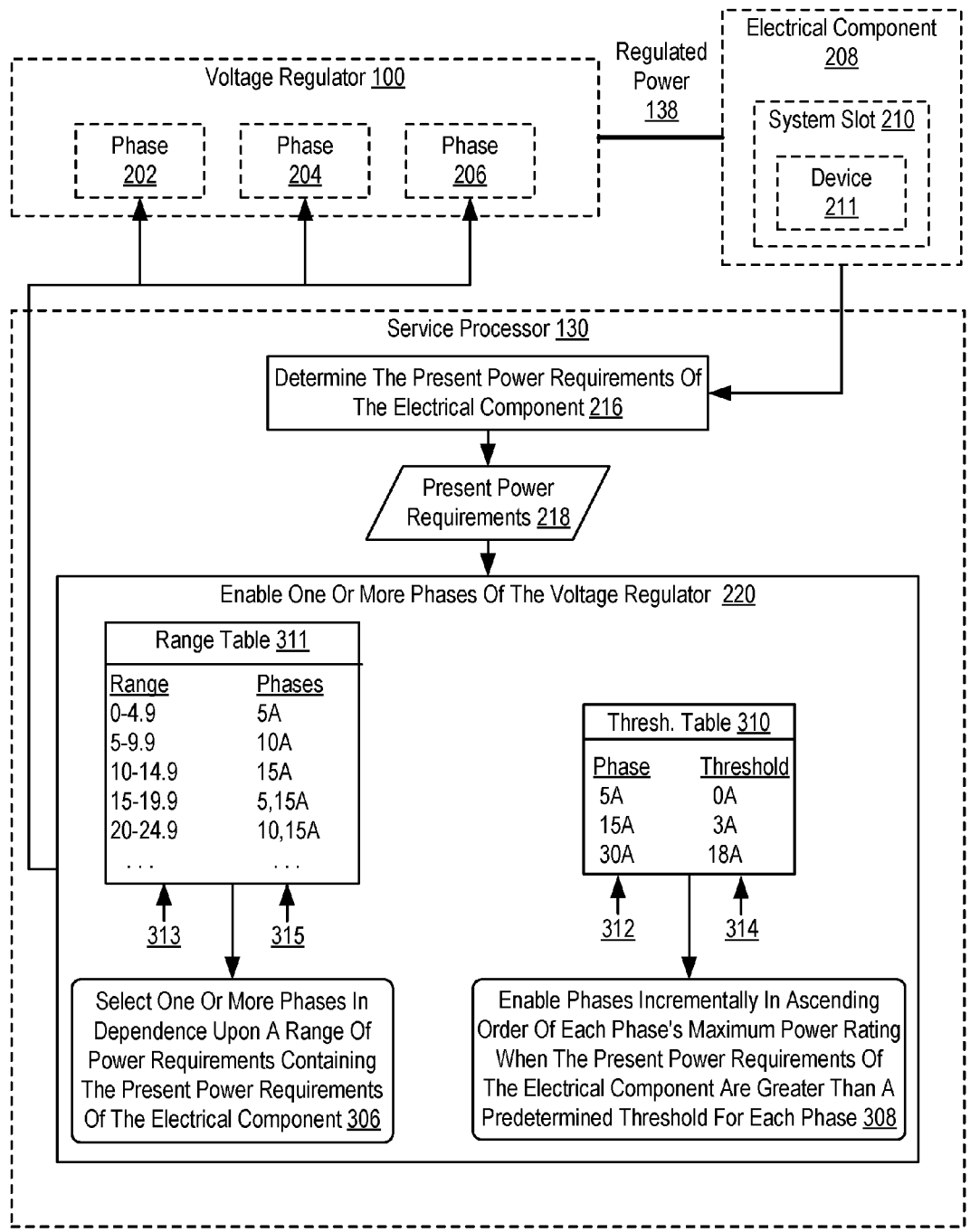
FIG. 3 sets forth a flow chart illustrating a further exemplary method for optimizing delivery of regulated power from a voltage regulator to an electrical component according to embodiments of the present invention.

For further explanation, FIG. 3 sets forth a flow chart illustrating a further exemplary method for optimizing delivery of regulated power from a voltage regulator to an electrical component according to embodiments of the present invention. The method of FIG. 3 is similar to the method of FIG. 2, including as it does, determining (216), by the service processor (130), the present power requirements (218) of the electrical component (208), and enabling (220), by the service processor (130), one or more phases (202, 204, 206) of the voltage regulator (100) in dependence upon the present power requirements (218) of the electrical component (208).

The method of FIG. 3 differs from the method of FIG. 2, however, in that the method of FIG. 3 includes two alternative methods of enabling (220), one or more phases (202, 204, 206) of the voltage regulator (100) in dependence upon the present power requirements (218) of the electrical component (208). In the method of FIG. 3, enabling (220), one or more phases (202, 204, 206) of the voltage regulator (100) includes selecting (306) one or more phases of the voltage regulator (100) to enable in dependence upon a range (304) of power requirements that contains the present power requirements of the electrical component (208). Selecting (306) one or more phases of the voltage regulator (100) to enable in dependence upon a range (304) of power requirements that contains the present power requirements of the electrical component (208) may by carried out by determining from a range table (311) a combination of phases to enable where the range table includes records associating a range (313) of power requirements with a combination (315) of phases to enable. In the example of FIG. 3, when the present power requirements of the electrical component (208) are 17 A, the service processor selects a 5 A and 15 A phase of the voltage regulator to enable because the range table (311) identifies such combination of phases as those to enable for the range of power requirements spanning 15-19.9 A, the range containing the present power requirements (218) of the electrical component.

In the method of FIG. 3, enabling (220), one or more phases (202, 204, 206) of the voltage regulator (100) may also include enabling (308) phases incrementally in ascending order of each phase's maximum power rating when the present power requirements (218) of the electrical component (208) are greater than a predetermined threshold for each phase. Enabling (308) phases incrementally in ascending order of each phase's maximum power rating when the present power requirements (218) of the electrical component (208) are greater than a predetermined threshold for each phase may be carried out, as described above with comparators, or as depicted here in dependence upon a threshold table (310) that includes a threshold (314) indicating when each phase (312) is to be enabled. The service processor (130) may compare the present power requirements (218) to the thresholds (314) listed in the threshold table (310) to identify which phases to enable.

Figure 4:
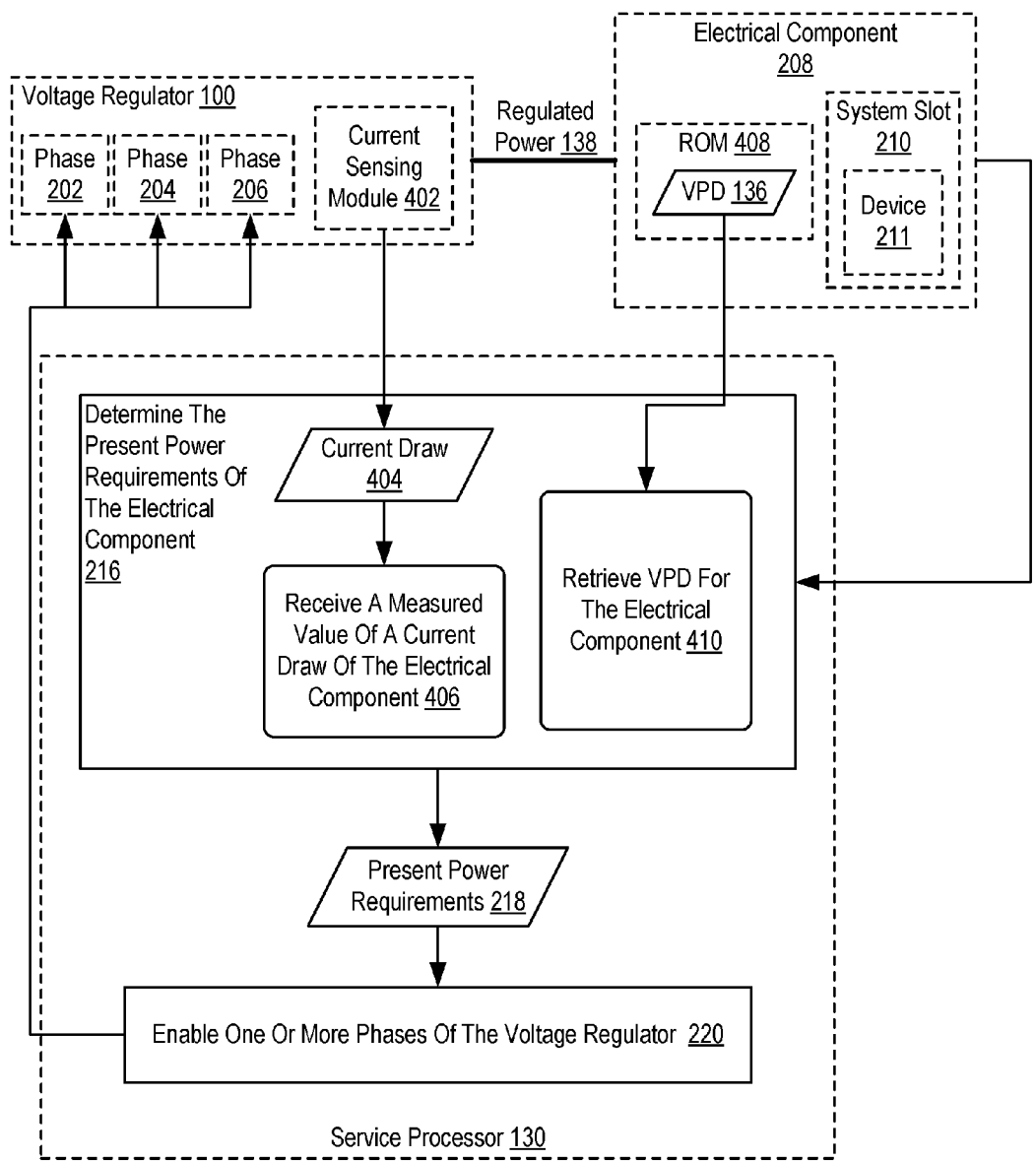
FIG. 4 sets forth a flow chart illustrating a further exemplary method for optimizing delivery of regulated power from a voltage regulator to an electrical component according to embodiments of the present invention.

For further explanation, FIG. 4 sets forth a flow chart illustrating a further exemplary method for optimizing delivery of regulated power from a voltage regulator to an electrical component according to embodiments of the present invention. The method of FIG. 4 is similar to the method of FIG. 2, including as it does, determining (216), by the service processor (130), the present power requirements (218) of the electrical component (208), and enabling (220), by the service processor (130), one or more phases (202, 204, 206) of the voltage regulator (100) in dependence upon the present power requirements (218) of the electrical component (208).

The method of FIG. 4 differs from the method of FIG. 3, however, in that the method of FIG. 4 includes two alternative methods of determining (216), by the service processor (130), the present power requirements (218) of the electrical component (208). In the method of FIG. 4, determining (216), by the service processor (130), the present power requirements (218) of the electrical component (208) includes receiving (406) from a current sensing module (402) of the voltage regulator (100) a measured value of a current draw (404) of the electrical component (208).

Also in the method of FIG. 4, determining (216), by the service processor (130), the present power requirements (218) of the electrical component (208) includes retrieving (410), from the electrical component (208), vital product data ('VPD') (136) for the electrical component (208). In the example of FIG. 4, the VPD (136) includes information stored in ROM (408) describing the electrical component (208) that enables the electrical component (208) to be administered at a system level. The VPD (136) in the example of FIG. 4 includes a power requirement for the electrical component (208).

Exemplary embodiments of the present invention are described largely in the context of a fully functional computer system for optimizing delivery of regulated power from a voltage regulator to an electrical component. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of optimizing delivery of regulated power from a voltage regulator to an electrical component, operation of the voltage regulator controlled by a service processor, the method comprising:
   determining, by the service processor, the present power requirements of the electrical component, the voltage regulator comprising a plurality of phases, each phase rated to deliver a different maximum power to the electrical component; and
   enabling, by the service processor, a plurality of phases of the voltage regulator in dependence upon the present power requirements of the electrical component, each enabled phase rated to deliver a different amount of power to the electrical component.

2. The method of claim 1 wherein enabling the plurality of phases of the voltage regulator in dependence upon the present power requirements of the electrical component further comprises:
   selecting the plurality of phases of the voltage regulator to enable in dependence upon a range of power requirements that contains the present power requirements of the electrical component.

3. The method of claim 1 wherein enabling the plurality of phases of the voltage regulator in dependence upon the present power requirements of the electrical component further comprises:
   enabling phases incrementally in ascending order of each phase's maximum power rating when the present power requirements of the electrical component are greater than a predetermined threshold for each phase.

4. The method of claim 1 further comprising:
   detecting, by the service processor during operation of the electrical component, a change in the present power requirements of the electrical component; and
   enabling, by the service processor, one or more phases of the voltage regulator in dependence upon the changed power requirements of the electrical component.

5. The method of claim 1 wherein determining the present power requirements of the electrical component further comprises:
   receiving from a current sensing module of the voltage regulator a measured value of a current draw of the electrical component.

6. The method of claim 1 wherein determining the present power requirements of the electrical component further comprises:
   retrieving, from the electrical component, vital product data ('VPD') for the electrical component, the VPD comprising information describing the electrical component that enables the electrical component to be administered at a system level, the VPD including a power requirement for the electrical component.

7. An apparatus for optimizing delivery of regulated power from a voltage regulator to an electrical component, the apparatus comprising a service processor controlling operation of the voltage regulator, a computer memory operatively coupled to the service processor, the computer memory having disposed within it computer program instructions capable of operating the service processor for:
   determining, by the service processor, the present power requirements of the electrical component, the voltage regulator comprising a plurality of phases, each phase rated to deliver a different maximum power to the electrical component; and
   enabling, by the service processor, a plurality of phases of the voltage regulator in dependence upon the present power requirements of the electrical component, each enabled phase rated to deliver a different amount of power to the electrical component.

8. The apparatus of claim 7 wherein enabling the plurality of phases of the voltage regulator in dependence upon the present power requirements of the electrical component further comprises:
   selecting one or more phases of the voltage regulator to enable in dependence upon a range of power requirements that contains the present power requirements of the electrical component.

9. The apparatus of claim 7 wherein enabling the plurality of phases of the voltage regulator in dependence upon the present power requirements of the electrical component further comprises:
   enabling phases incrementally in ascending order of each phase's maximum power rating when the present power requirements of the electrical component are greater than a predetermined threshold for each phase.

10. The apparatus of claim 7 further comprising computer program instructions capable of operating the service processor for:

detecting, by the service processor during operation of the electrical component, a change in the present power requirements of the electrical component; and enabling, by the service processor, one or more phases of the voltage regulator in dependence upon the changed power requirements of the electrical component.

11. The apparatus of claim 7 wherein determining the present power requirements of the electrical component further comprises:

receiving from a current sensing module of the voltage regulator a measured value of a current draw of the electrical component.

12. The apparatus of claim 7 wherein determining the present power requirements of the electrical component further comprises:

retrieving, from the electrical component, vital product data ('VPD') for the electrical component, the VPD comprising information describing the electrical component that enables the electrical component to be administered at a system level, the VPD including a power requirement for the electrical component.

13. A computer program product for optimizing delivery of regulated power from a voltage regulator to an electrical component, operation of the voltage regulator controlled by a service processor, the computer program product disposed in a computer readable medium, wherein the computer readable medium is not a signal, the computer program product comprising computer program instructions capable of:

determining, by the service processor, the present power requirements of the electrical component, the voltage regulator comprising a plurality of phases, each phase rated to deliver a different maximum power to the electrical component; and enabling, by the service processor, a plurality of phases of the voltage regulator in dependence upon the present power requirements of the electrical component, each enabled phase rated to deliver a different amount of power to the electrical component.

14. The computer program product of claim 13 wherein enabling the plurality of phases of the voltage regulator in dependence upon the present power requirements of the electrical component further comprises:

selecting one or more phases of the voltage regulator to enable in dependence upon a range of power requirements that contains the present power requirements of the electrical component.

15. The computer program product of claim 13 wherein enabling the plurality of phases of the voltage regulator in dependence upon the present power requirements of the electrical component further comprises:

enabling phases incrementally in ascending order of each phase's maximum power rating when the present power requirements of the electrical component are greater than a predetermined threshold for each phase.

16. The computer program product of claim 13 further comprising computer program instructions capable of:

detecting, by the service processor during operation of the electrical component, a change in the present power requirements of the electrical component; and enabling, by the service processor, one or more phases of the voltage regulator in dependence upon the changed power requirements of the electrical component.

17. The computer program product of claim 13 wherein determining the present power requirements of the electrical component further comprises:

receiving from a current sensing module of the voltage regulator a measured value of a current draw of the electrical component.

18. The computer program product of claim 13 wherein determining the present power requirements of the electrical component further comprises:

retrieving, from the electrical component, vital product data ('VPD') for the electrical component, the VPD comprising information describing the electrical component that enables the electrical component to be administered at a system level, the VPD including a power requirement for the electrical component.

* * * * *